US010986039B2

(12) United States Patent
Sufleta et al.

(10) Patent No.: US 10,986,039 B2
(45) Date of Patent: Apr. 20, 2021

(54) TRAFFIC BROKER FOR ROUTING DATA PACKETS THROUGH SEQUENCES OF IN-LINE TOOLS

(71) Applicant: Gigamon Inc., Santa Clara, CA (US)

(72) Inventors: Zbigniew Sufleta, Cobb, CA (US); Hung Nguyen, Milpitas, CA (US)

(73) Assignee: Gigamon Inc., Santa Clara, CA (US)

( * ) Notice: Subject to any disclaimer, the term of this patent is extended or adjusted under 35 U.S.C. 154(b) by 471 days.

(21) Appl. No.: 14/938,700

(22) Filed: Nov. 11, 2015

(65) Prior Publication Data

US 2017/0134309 A1 May 11, 2017

(51) Int. Cl.
*H04L 12/935* (2013.01)

(52) U.S. Cl.
CPC .................................... *H04L 49/30* (2013.01)

(58) Field of Classification Search
None
See application file for complete search history.

(56) References Cited

U.S. PATENT DOCUMENTS 6,694,310 B1 * 2/2004 Yu ......................... G06F 16/258 707/718
7,924,712 B2 * 4/2011 Alex ....................... H04L 47/10 370/230
8,817,625 B1 * 8/2014 Zhang .................. H04Q 3/0029 370/235
10,439,886 B2 * 10/2019 Lapiotis ................ H04L 41/145
2004/0249984 A1 * 12/2004 Das ......................... G06F 9/505 709/249
2008/0019376 A1 * 1/2008 Elias ..................... H04L 43/026 370/395.52
2012/0008505 A1 * 1/2012 LaVigne ............. H04L 12/4633 370/241
2012/0257501 A1 * 10/2012 Kucharczyk ............ H04L 47/30 370/235
2014/0204955 A1 * 7/2014 Kelly ...................... H04L 49/30 370/401
2015/0003455 A1 * 1/2015 Haddad ................... H04L 45/38 370/392
2015/0081855 A1 * 3/2015 Zhang ..................... H04L 41/12 709/220
2015/0124815 A1 * 5/2015 Beliveau ................. H04L 45/38 370/392
2015/0281063 A1 * 10/2015 Bitar ....................... H04L 45/74 370/392
2015/0326473 A1 * 11/2015 Dunbar ............... H04L 12/4633 370/392
2015/0334045 A1 * 11/2015 Tremblay ............. H04L 47/783 709/226
2016/0050131 A1 * 2/2016 Zhang ................. H04L 43/0811 370/244
2016/0094632 A1 * 3/2016 Jain ..................... H04L 41/0803 709/204
2016/0149784 A1 * 5/2016 Zhang .................. H04B 1/0003 370/229

(Continued)

*Primary Examiner* — Gregory B Sefcheck
*Assistant Examiner* — Suk Jin Kang
(74) *Attorney, Agent, or Firm* — Perkins Coie LLP

(57) ABSTRACT

Embodiments are disclosed for a network switch appliance with a traffic broker that facilitates routing of network traffic between pairs of end nodes on a computer network through a configurable sequence of in-line tools.

20 Claims, 11 Drawing Sheets

100
Network 110a
122
Network Switch Appliance 120
130
143 142 141
In-line Traffic Broker Module 126
In-line Tool 150
In-line Tool 152
In-line Tool 154
132
146 145 144
Network 110b

(56) References Cited

U.S. PATENT DOCUMENTS

| | | | | |
|---|---|---|---|---|
| 2016/0149788 | A1* | 5/2016 | Zhang | H04L 43/10 709/224 |
| 2016/0285973 | A1* | 9/2016 | Shah | G06F 21/55 |
| 2016/0294664 | A1* | 10/2016 | Manghirmalani | H04L 43/12 |
| 2016/0294732 | A1* | 10/2016 | Chou | H04L 45/38 |
| 2016/0337244 | A1* | 11/2016 | Baveja | H04L 67/1002 |
| 2016/0344565 | A1* | 11/2016 | Batz | H04L 12/1407 |
| 2016/0344803 | A1* | 11/2016 | Batz | H04L 12/1407 |
| 2017/0019303 | A1* | 1/2017 | Swamy | H04L 41/5041 |
| 2017/0019335 | A1* | 1/2017 | Schultz | H04L 43/0876 |
| 2017/0026227 | A1* | 1/2017 | Lian | H04L 41/0668 |
| 2017/0026287 | A1* | 1/2017 | Vinsel | H04L 45/66 |
| 2017/0026289 | A1* | 1/2017 | Vinsel | H04L 45/7453 |
| 2017/0134265 | A1* | 5/2017 | Haddad | H04L 45/38 |
| 2017/0264677 | A1* | 9/2017 | Li | H04L 29/06 |
| 2018/0063032 | A1* | 3/2018 | Chou | H04L 49/25 |
| 2018/0227226 | A1* | 8/2018 | Lu | H04L 45/38 |

* cited by examiner

TRAFFIC BROKER FOR ROUTING DATA PACKETS THROUGH SEQUENCES OF IN-LINE TOOLS

TECHNICAL FIELD

The present disclosure generally relates to network switching and monitoring technology, and more particularly to the routing of network traffic through sequences of in-line tools.

BACKGROUND

With ever-increasing amounts of data traffic on modern computer networks, network monitoring and security measures play an increasingly important role in reducing the vulnerability of a network to intrusion, unauthorized access and other security or performance issues. Tools can be deployed in a computer network that process the network traffic and provide monitoring and security services. Examples of network monitoring tools include an intrusion detection system (IDS), an intrusion prevention system (IPS), a sniffer, a network monitoring system, an application monitoring system, an intrusion detection system, a forensic storage system, an application security system, among others. However, tools are only as effective as the network traffic that they can see. Existing approaches involve deploying multiple editions of the same tool across a computer network to increase visibility to the network traffic. This can be expensive and difficult to scale and manage.

A network switch communicatively coupled between communicating nodes on a computer network can route packets to centralized tools for processing. To be more responsive to emerging security threats, many out-of-band tools which used to passively monitor traffic are moving to in-line deployments. In an in-line deployment, packets originating from one node on a computer network are routed through the in-line tool before continuing on to another node on a computer network.

BRIEF DESCRIPTION OF THE DRAWINGS

The present disclosure is illustrated by way of example, and not by way of limitation, in the figures of the accompanying drawings and in which like reference numerals refer to similar elements. The figures of the accompanying drawings depict only example embodiments of the present disclosure and are therefore not to be construed as limiting. In the drawings.

DETAILED DESCRIPTION

Overview

A network switch appliance communicatively coupled between communicating nodes on a computer network can route packets to centralized tools for processing. As used herein, the term "tool," may be used interchangeably with other terms such as "instrument" or "device." In some deployments, multiple in-line tools are communicatively coupled to the network switch appliance so that packets transmitted from a source node to a destination node are routed through a sequence of in-line tools that apply various processing to the packets. In an example sequence, a packet is routed through an in-line tool configured for internal monitoring before being routed through an in-line tool configured for intrusion detection.

One solution for deploying multiple in-line tools involves serially connecting the in-line tools to the network switch appliance. However, in such a deployment, the sequence of in-line tools through which packets are processed will depend on the order in which the in-line tools are serially connected. Accordingly, reconfiguring the tool sequence may require the burdensome task of reconnecting the in-line tools in a new order.

To avoid this issue, the present disclosure describes an in-line traffic broker for guiding network traffic through specified sequences of one or more in-line tools using a configurable switching fabric. In some embodiments, user-defined flow-to-tool-sequence requests are translated into packet dispatch schemes for individual ports at a network switch appliance. "Flows" or "network traffic flows" are generally understood to include a segment of network traffic comprising packets that satisfy a specified criterion (e.g., packets originating from a particular source IP address). The dispatch schemes are then used to configure the switching fabric of the network switch appliance. The terms "packet dispatch scheme," "dispatch scheme," "dispatch arrangement," and "flow dispatch arrangement" may be used interchangeably herein.

Example System for In-Line Traffic Brokering

Figure 1:
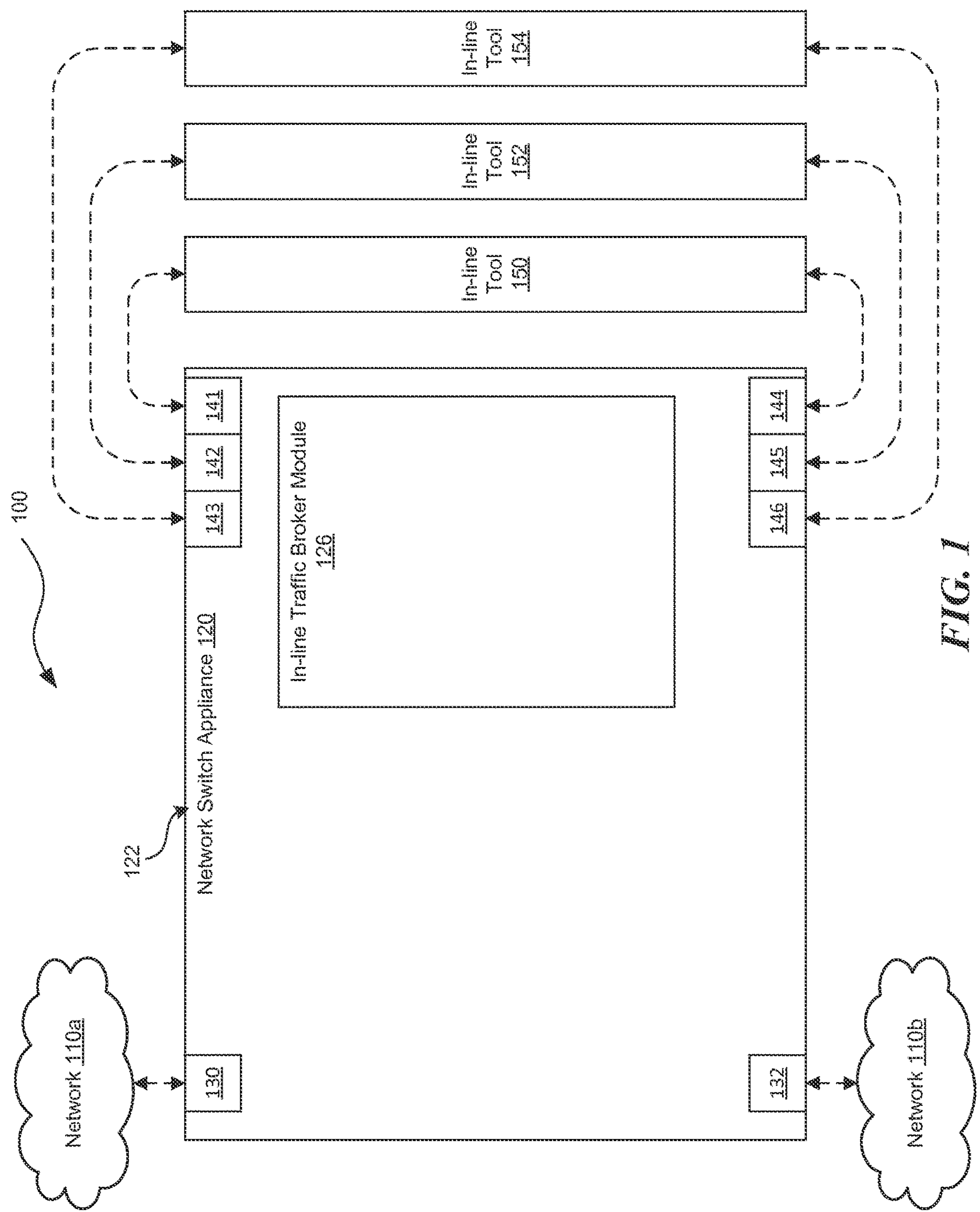
FIG. 1 shows an example system for in-line traffic brokering.

FIG. 1 shows an example system 100 for in-line traffic brokering. As shown in FIG. 1, system 100 includes a network switch appliance 120 connected to networks 110*a-b* and one or more in-line tools 150, 152, and 154. The network switch appliance 120 includes network ports 130, 132, and instrument ports 140-145. The example network switch appliance 120 is shown in FIG. 1 as having two network ports and six instrument ports for clarity, however in other embodiments the network switch appliance can have more or fewer network and instrument ports. In some embodiments, network switch appliance 120 includes a housing 122 enclosing an in-line traffic broker module (also referred to herein as a "packet processing module," "processing module" or "processing unit") 126. In such an embodiment, the network ports 130-132 and instrument ports 140-145 may be built into the housing 122. In other illustrated embodiments, network switch appliance 120 also includes other components for processing packets. In such embodiments, additional processing components may be separate components, or may be integrated as part of in-line traffic broker module 126. In some embodiments, network switch appliance includes physical layer transceiver circuitry (e.g. a Network PHY chip) (not shown) coupled to each of the respective ports 130-132 and 141-146. Network PHYs may be considered to be parts of the processing module 126 or may be considered to be components that are separate from the processing module 126. The PHY is configured to connect a link layer device to a physical medium such as an optical fiber, copper cable, etc. In other embodiments, instead of the PHY, the network switch appliance 120 includes an optical transceiver, or a SERDES, etc. The housing 122 allows the network switch appliance 120 to be carried, transported, sold, and/or operated as a single unit.

The ports 130-132, and 141-146 are shown in FIG. 1 in simplified form for clarity and illustrative purposes. In some embodiments, ports 130-132, and 141-146 are located at a periphery of the housing 122. In other embodiments, the ports 130-132, and 141-146 are located at other locations relative to the housing 122. Ports 130-132 and 140-145 shown in FIG. 1 may represent single physical ports in some embodiments. In other embodiments, ports 130-132 and 141-146 shown in FIG. 1 represent virtual ports that may be combined as part of one or more physical ports. For example, network ports 130 and 132 may be part of a single physical port installed in the housing 122 of network switch appliance 120. Similarly, ports 130-132 and 141-146 may be aggregates of multiple physical ports through common switch fabric arrangements known as link aggregation or trunking For example, each of the ports labeled 141 and 144 in FIG. 1 can represent a group of physical ports used as a single packet transmission channel through link aggregation.

During use, the first network port 130 of the network switch appliance 120 is communicatively coupled to a first node via network 110*a*, and the second network port 132 is communicatively coupled to a second node via network 110*b*. Network 110*a* and 110*b* may be separate networks or part of the same network. The network switch appliance 120 is configured to receive packets from the first and second nodes via the network ports 130, 132. As used herein, the node from which a packet originates is referred to as a “source node,” and the node to which that packet is destined is referred to as a “destination node.” The terms “source node” and “destination node” are relative to a given packet. In other words, a particular node on computer network may operate as both a “source node” relative to packets it transmits and a “destination node” relative to packets it receives. Also, during use, the instrument ports 141-146 of the network switch appliance 120 are communicatively coupled to one or more in-line tools, for example, in-line tools 150, 152, 154 shown in FIG. 1. The one or more in-line tools 150, 152, 154 may be directly coupled to the network switch appliance 120, or communicatively coupled to the network switch appliance 120 through a network (e.g., Internet). Tunneling may be applied where in-line tools 150, 152, 154 are communicatively coupled to the network switch appliance 120 via a network such as the Internet. In an embodiment, network traffic transmitted from the network switch appliance 120 to an in-line tool is encapsulated into an IP tunnel envelope. The network traffic is then de-encapsulated at the in-line tool. Such an arrangement may require that the in-line tool 150, 152, 154 receive tunneling arrangements to facilitate de-encapsulation. In another embodiment, an in-line tool 150, 152, 154 may be communicatively coupled to the network switch appliance 120 via a stacking link of one or more other network switch appliances. For example, a network switch appliance 120 including a processing component such as in-line traffic broker module 126 may be interconnected using stacking links with one or more other physical network switch appliances. The interconnected network switch appliance 120 and one or more other network switch appliances act as single switch in such a configuration. Therefore an in-line tool 150, 152, 154 may be directly connected to one or more of the other network switch appliances. In some cases, the network switch appliance 120 is provided as a single unit that allows the appliance 120 to be deployed at a single point along a communication path. In the illustrated embodiments, the in-line traffic broker module 126 is configured to receive packets from one or more source nodes via the network ports 130, 132 communicatively coupled to a network 110*a-b*, and process the packets in accordance with the schemes described herein. For example, the in-line traffic broker module 126 may pass packets received from one or more source nodes to one or more in-line tools 150, 152, 154 that are connected to respective instrument port(s) 141-141. Similarly, packet in-line traffic broker module 126 may receive packets from an in-line tool 150, 152, 154 after processing and forward to another in-line tool 150, 152, 154, via an instrument port 141-146, or forward to the destination node via a network port 130, 132 communicative coupled to a network 110*a-b*.

Figure 4:
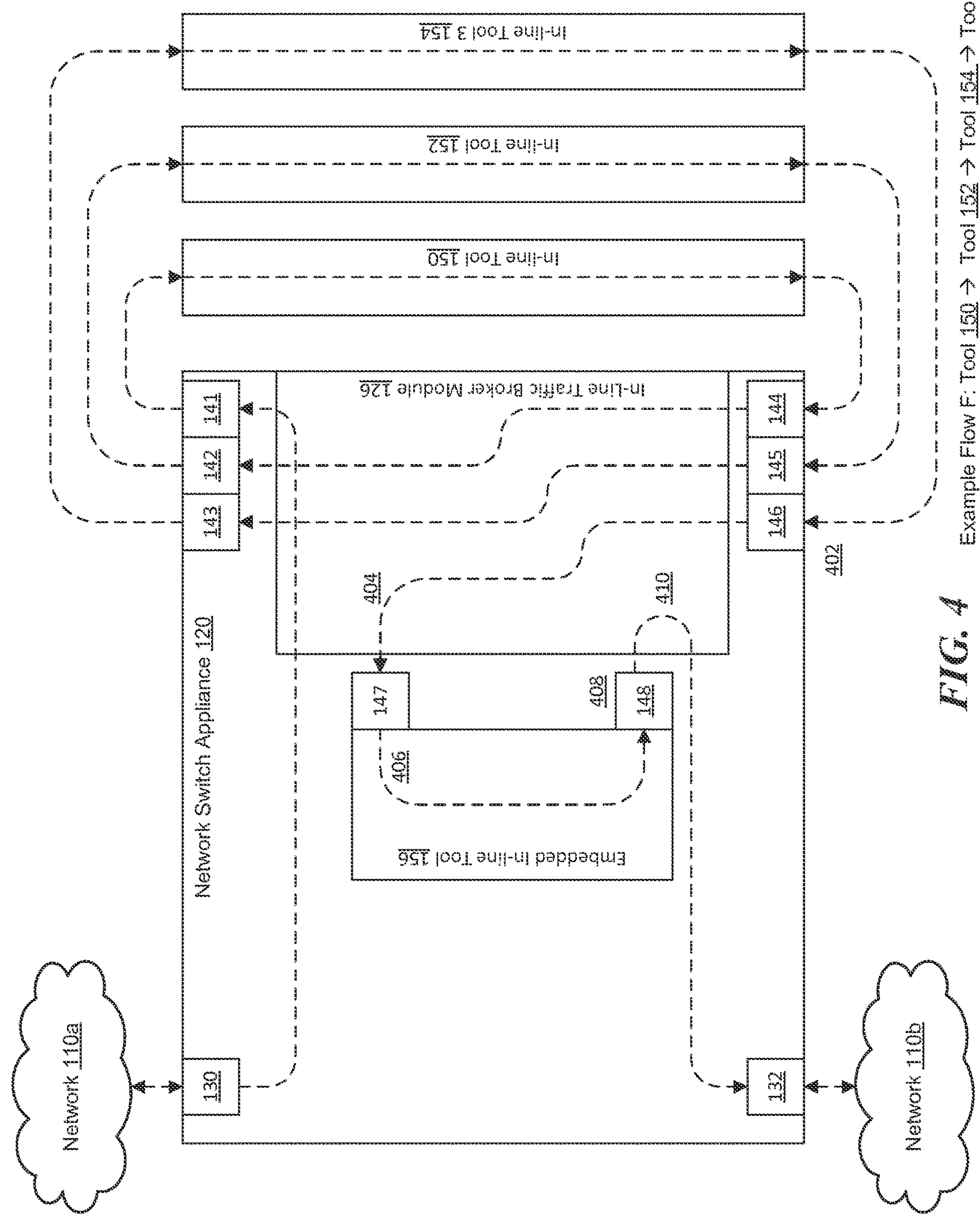
FIG. 4 shows an example system for in-line traffic brokering with embedded in-line tools.

In some embodiments, the in-line traffic broker module 126 is configured to operate as a switch module or packet switch that provides packet transmission in accordance with a pre-determined and/or programmable transmission scheme. In some embodiments, the packet switch may be user-configurable such that packets may be transmitted in a one-to-one configuration (i.e., from one network port to an instrument port). As used in this specification, the term “instrument port” refers to any port that is configured to transmit packets to an instrument or device of some type for packet processing (e.g. an in-line tool 150, 152, 154). The instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc. The instrument may also be a pass through device that can receive packets originating from a source node, and transmit the packets back to the appliance 120 after the packets have been processed where the packets are then forwarded to a destination node. An example pass-through device is an intrusion prevention system. As shown in FIG. 1, in-line tools 150, 152, 143 are pass-through devices meaning that they are configured to be in-line with the transmission path between a source node and a destination node. The terms “instrument” or “tools” are not limited to discrete physical devices. For example, an in-line tool may be virtualized through a combination of software and/or hardware and may, in some embodiments, be integrated (partially or completely) into the network switch appliance 120, for example, as illustrated in FIG. 4.

In some embodiments, the packet switch is configured such that the packets are transmitted in a one-to-many configuration (i.e., from one network port to multiple instrument ports). In other embodiments, the packet switch is configured such that the packets are transmitted in a many-to-many configuration (i.e., from multiple network ports to multiple instrument ports). In further embodiments, the packet switch is configured such that the packets are transmitted in a many-to-one configuration (i.e., from multiple network ports to one instrument port). In some embodiments, the one-to-one, one-to-many, many-to-many, and many-to-one configurations are all available for allowing a user to selectively configure the network switch appliance 120 so that the packets (or certain types of packets) are routed according to any one of these configurations. In some embodiments, the packet movement configuration is predetermined such that when the packet switch appliance 120 receives the packets, the packet switch appliance 120 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.). Examples of packet switches that may be used to implement features described herein include any of the commercially available network switch devices, such as GigaVUE™, produced by Gigamon, Inc.

It should be noted that the packet switch that may be used with the network switch appliance 120 is not limited to the examples described above, and that other packet switches with different configurations may be used as well. Also, in any of the embodiments described herein, the processing unit (i.e., in-line traffic broker module 126) implementing the packet switch may be any integrated circuit, such as a processor (e.g., a general purpose processor, a network processor, an ASIC processor, a FPGA processor, etc.). In some embodiments, the processing unit may be a processor, such as a field processor. In other embodiments, the processing unit may be a network card. Also, in some embodiments, the processing unit may include ternary content-addressable memory (TCAM). By means of non-limiting examples, the processing unit may be a type StrataXGS family device, manufactured by Broadcom, at Irvine, Calif. The processing unit may be configured to perform various packet processing functions, included but not limited to packet filtering, packet routing, packet switching, packet mirroring, packet aggregation, etc.

In-Line Traffic Brokering

FIGS. 2A-2D show example network traffic routes for example network flows A-C. The example routes are shown through a system similar to system 100 described in FIG. 1. As explained earlier, a “flow” describes a segment of traffic that includes packets that match a specified criteria. The example routes shown in FIGS. 2A-2D are intended to illustrate the routing of traffic through a sequence of tools based on packet characteristics and ingress port, and are not intended to be limiting. Any number of combinations of tools, ports, and specified flows may be implemented while staying within the scope of the present innovation.

Figure 2A:
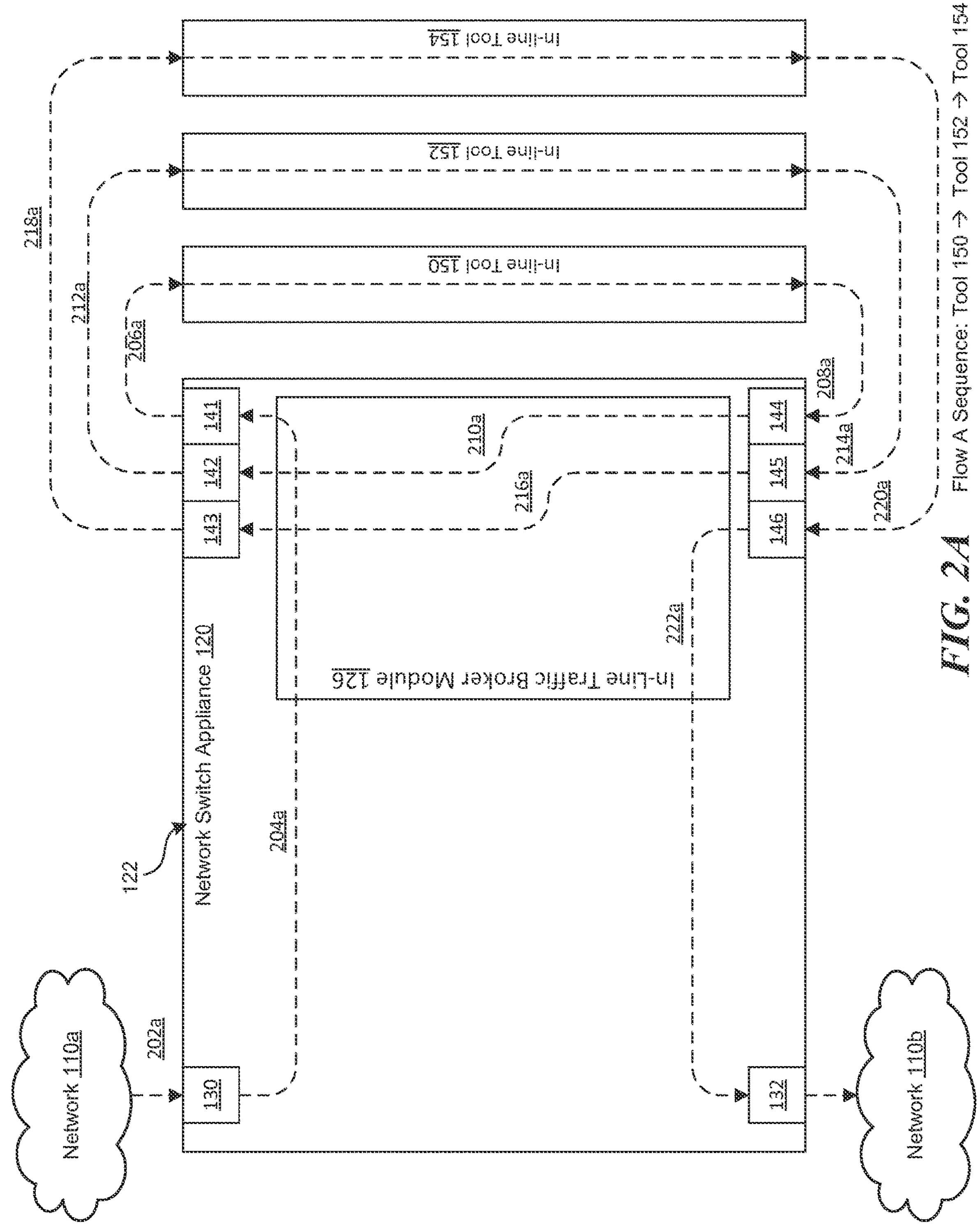
FIG. 2A shows an example route for a first network traffic flow through a system such as shown in FIG. 1.

FIG. 2A shows example network traffic routes through in-line tools 150, 152, and 154 for network traffic that matches flow A. As shown in FIG. 2A, in this example, traffic associated with flow A is routed through the following sequence of in-line tools: tool 150→tool 152→tool 154.

At step 202*a*, a packet is received from a source node via network 110*a* at a first ingress port of the network switch appliance 120. Here, the first ingress port is network port 130.

At step 204*a*, the packet is then forwarded (e.g. via switching fabric of in-line traffic broker module 126) to a first egress port according to a packet dispatch scheme (described in more detail herein). Here, the first egress port is instrument port 141 which is, in use, communicatively coupled to in-line tool 150. Therefore, the packet forwarded to instrument port 141 is then transmitted at step 206*a* to in-line tool 150 where it is processed according to the configuration of that tool. After processing, the packet is returned to network switch appliance and received at step 208*a* at a second ingress port. Here, the second ingress port is instrument port 144.

At step 210*a*, the packet is then forwarded (e.g. via switching fabric of in-line traffic broker module 126) to a second egress port according to the packet dispatch scheme. Here, the second egress port is instrument port 142 which is, in use, communicatively coupled to in-line tool 152. Therefore, the packet forwarded to instrument port 142 is transmitted at step 212*a* to in-line tool 152 where it is processed according to the configuration of that tool. After processing, the packet is returned to network switch appliance and received at step 214*a* at a third ingress port. Here, the third ingress port is instrument port 145.

At step 216*a*, the packet is then forwarded (e.g. via switching fabric of in-line traffic broker module 126) to a third egress port according to the packet dispatch scheme. Here, the third egress port is instrument port 143 which is, in use, communicatively coupled to in-line tool 154. Therefore, the packet forwarded to instrument port 143 is then transmitted at step 218*a* to in-line tool 154 where it is processed according to the configuration of that tool. After processing, the packet is returned to network switch appliance and received at step 220*a* at a fourth ingress port. Here, the fourth ingress port is instrument port 146.

At step 222*a*, the packet is then forwarded (e.g. via switching fabric of in-line traffic broker module 126) to a third egress port according to the packet dispatch scheme. Here the third egress port is network port 132 which is, in use, communicatively coupled to a destination node via network 110*b*. Therefore, the packet forwarded to network port 132 is then transmitted at step 224*a* to the destination doe via network 110*b*.

Figure 2B:
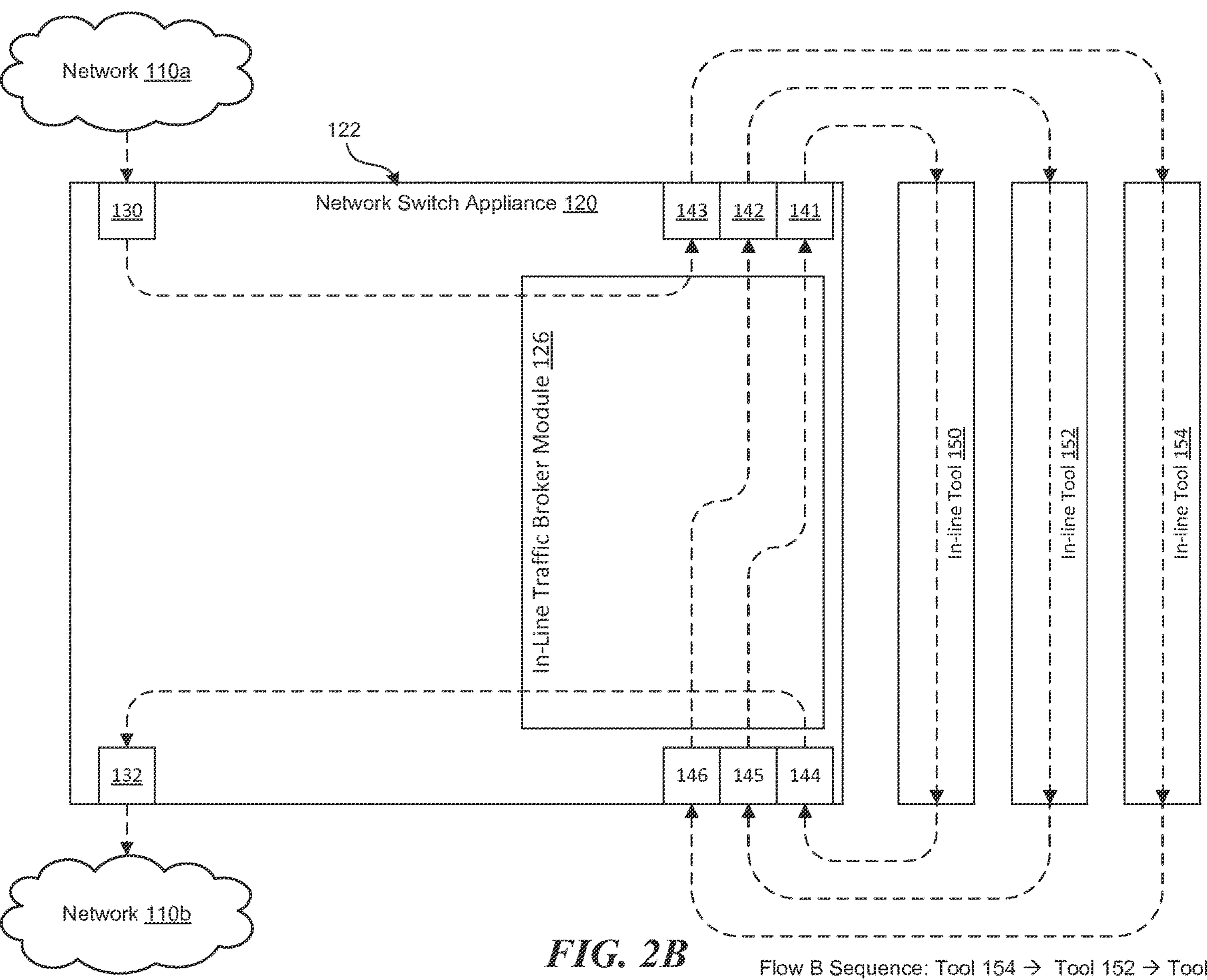
FIG. 2B shows an example route for a second network traffic flow through a system such as shown in FIG. 1.

FIG. 2B shows example network traffic routes through in-line tools 150, 152, and 154 for network traffic that matches flow B. As shown in FIG. 2B, in this example, traffic associated with flow B is routed through the following sequence of in-line tools: tool 154→tool 152→tool 150.

Figure 2C:
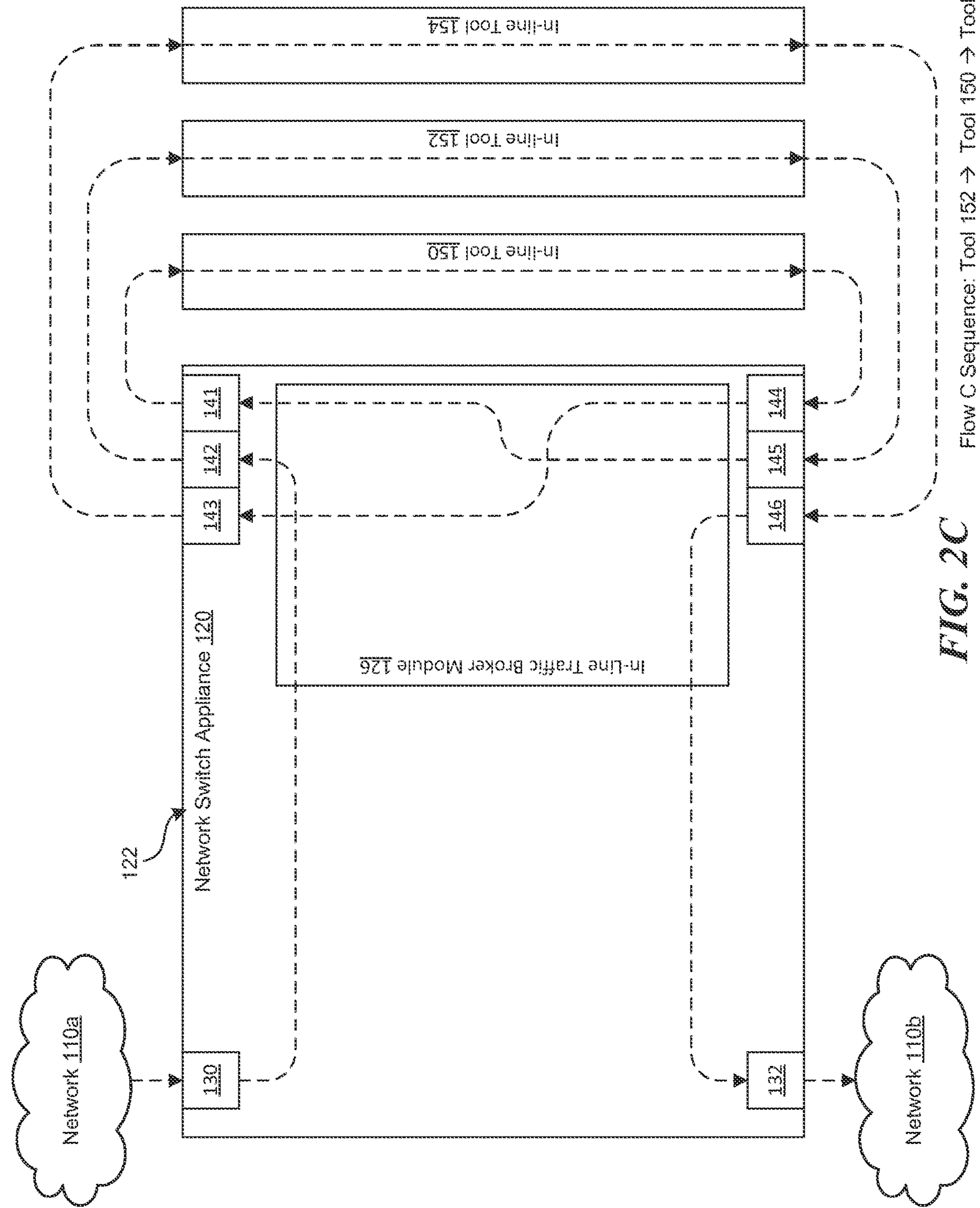
FIG. 2C shows an example route for a third network traffic flow through a system such as shown in FIG. 1.

FIG. 2C shows example network traffic routes through in-line tools 150, 152, and 154 for network traffic that matches flow C. As shown in FIG. 2C, in this example, traffic associated with flow C is routed through the following sequence of in-line tools: tool 152→tool 150→tool 154.

Figure 2D:
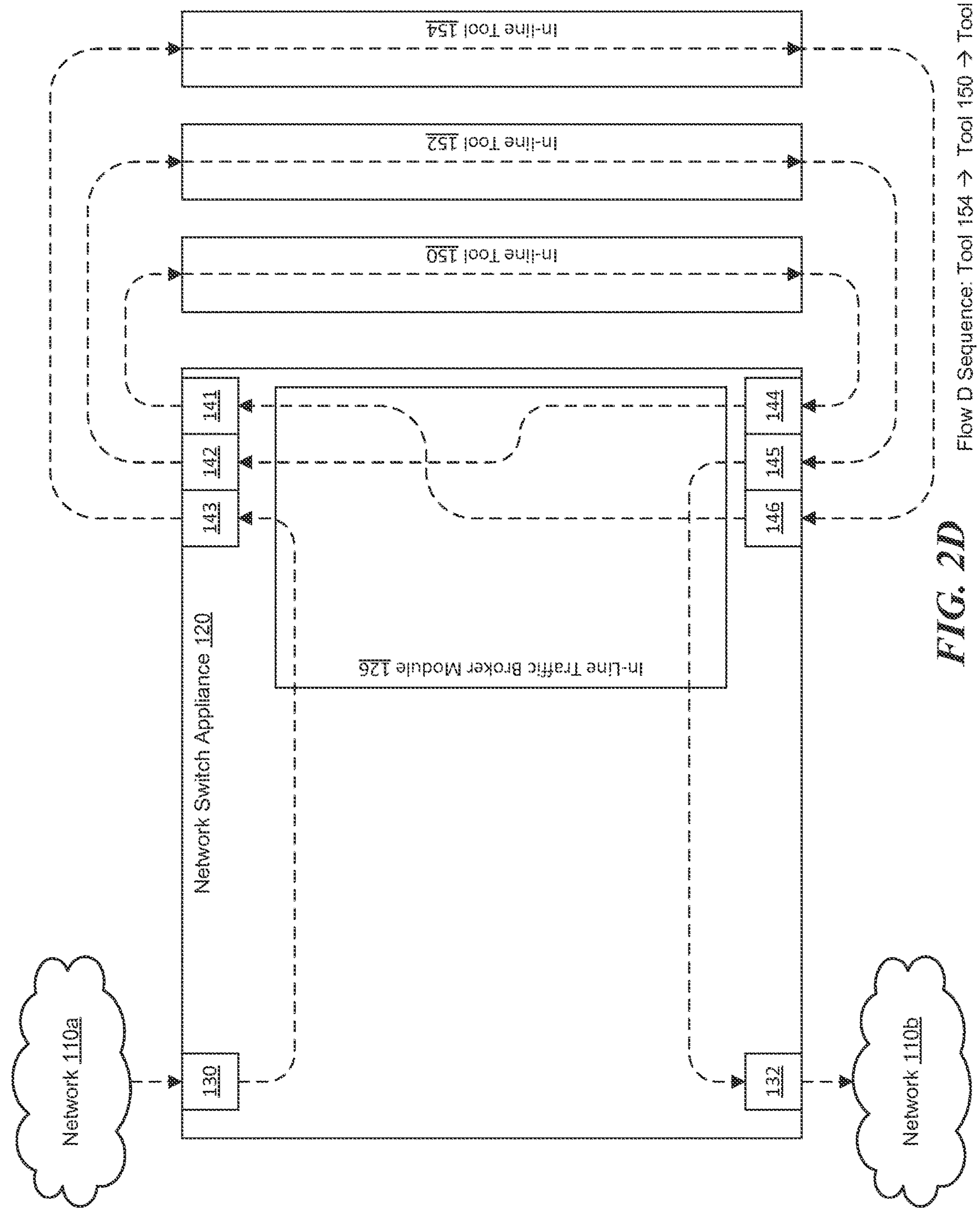
FIG. 2D shows an example route for a fourth network traffic flow through a system such as shown in FIG. 1.

FIG. 2D shows example network traffic routes through in-line tools 150, 152, and 154 for network traffic that matches flow D. As shown in FIG. 2D, in this example, traffic associated with flow D is routed through the following sequence of in-line tools: tool 154→tool 150→tool 152.

Note that the in-line tools 150, 152, and 154 as shown in FIGS. 2B-2D are communicatively coupled to the same respective instrument ports 141-146 as they are in FIG. 2A. Routing according to each new sequence is handled by the in-line traffic broker module 126 by forwarding the packet to the correct egress port based on the specified sequence for a particular flow. Therefore, a system can be configured to route different specified flows through different sequences of in-line tools without re-patching physical connections between in-line tools and the network switch appliance or reconfiguring port assignments.

Figure 3:
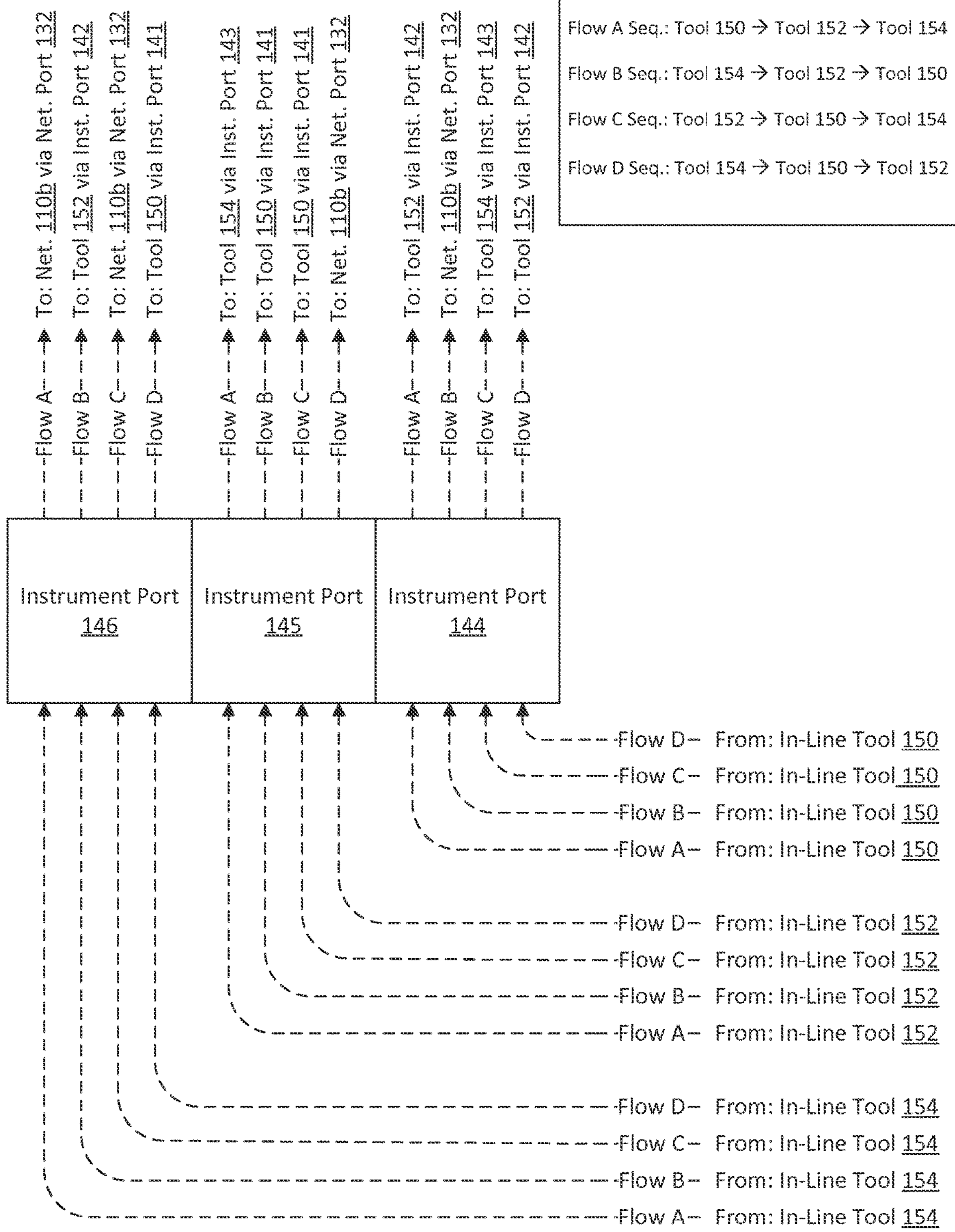
FIG. 3 shows details of the example network traffic routes through a system such as shown in FIG. 1.

This approach is illustrated further in FIG. 3 that shows a detail of instrument ports 144, 145, and 146 of network switch appliance 120 (as shown in FIGS. 2A-2D) along with packet routing paths that describe the packet dispatch scheme at each port for each of the flows A, B, C, and D.

For example, as shown in FIG. 3 and FIGS. 2A-2D, instrument port 144 is communicatively coupled to in-line tool 150. Therefore, according to this arrangement, any data traffic received at instrument port 144 is received from in-line tool 150. Further, a switching fabric (e.g. of in-line tool broker 126) is configured to route traffic received at instrument port 144 to an egress port of the network switch appliance according to which flow the traffic is associated with. Here, four arrowed lines, representing each of the flows A-D are shown entering instrument port 144. The four lines are shown for clarity, however it should be understood, that in some embodiments, all flows would travel along the same communication path from in-line tool 150. The packet dispatch scheme for instrument port 144, which is based on the specified tool sequences for each specified flow, governs which egress port to route the traffic to according to the flow that it is associated with.

Figure 5A:
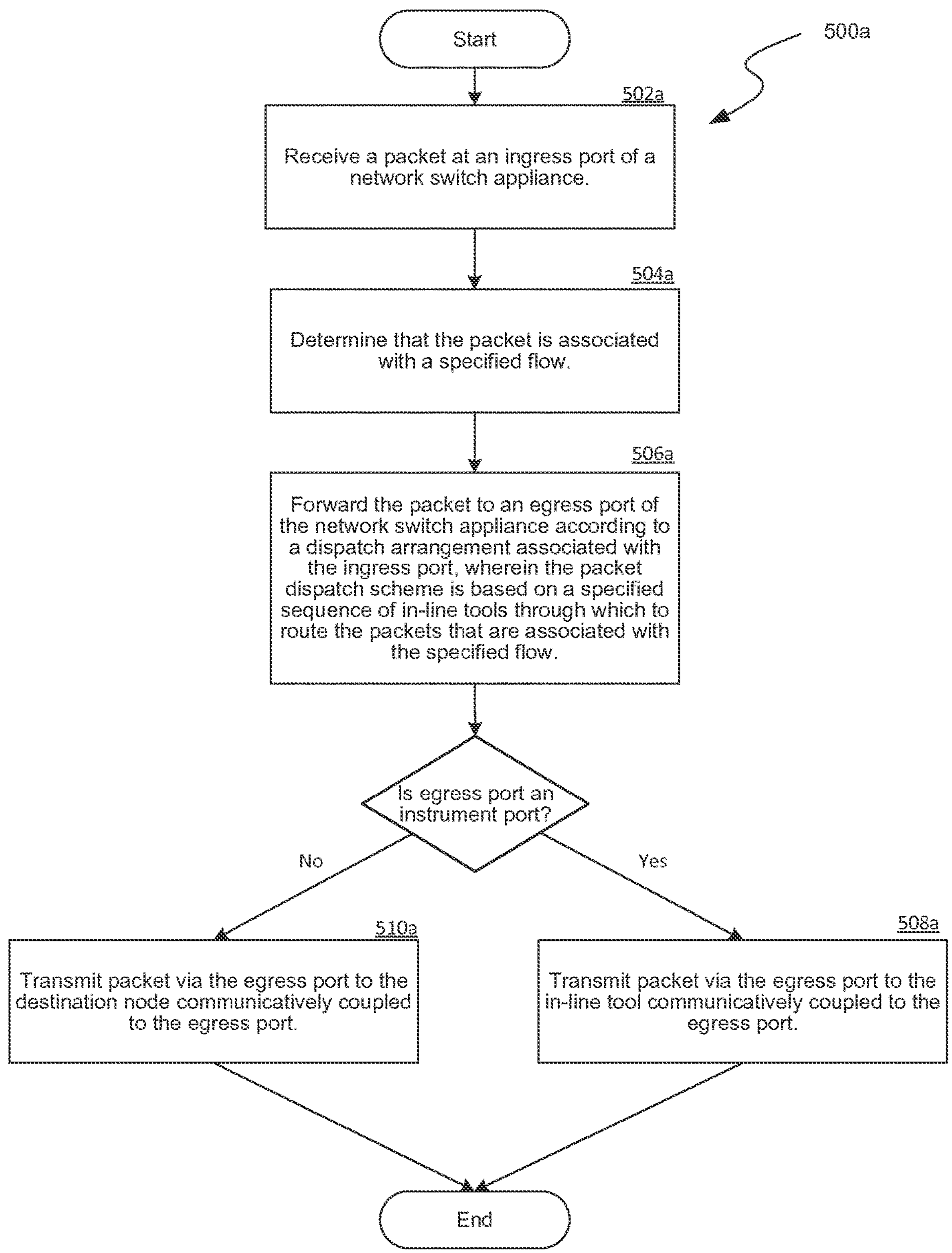
FIG. 5A shows a flow diagram for an example process for routing packets according to a packet dispatch scheme.

FIG. 5A shows a flow diagram 500*a* for an example process for routing packets according to a packet dispatch scheme. At step 502*a*, upon receipt of a packet at an ingress port (e.g. instrument port 144), the in-line tool broker module 126, at step 504*a*, determines that the packet is associated with a specified flow. At step 506*a*, the in-line tool broker module 126 then forwards the packet to an egress port via a switching fabric according to a packet dispatch scheme based on a specified sequence of in-line tools through which to route packets associated with the specified flow. If the egress port is an instrument port, at step 508*a*, the packet continues to one of the in-line tools 150, 152, 154 communicatively coupled to the network switch appliance 120. If the egress port is a network port, at step 510*a*, the packet continues to the destination node via the network 110*b*.

Returning to FIG. 3, in some embodiments, the in-line tool broker module 126 or some other processing component includes or has access to stored packet matching rules, for example stored in a non-transitory storage medium. In some embodiments, ternary content-addressable memory (TCAM) is used to improve the speed of packet matching and route lookup. As explained earlier a "flow" is simply a segment of network traffic that fits a specified criteria. Therefore, as long as the criteria for a flow is known, the packets associated with that flow can be identified by matching the individual received packets to that criteria. Examples of packet matching criteria include, but are not limited to, ingress port identifier (e.g. network port identifier), source and/or destination node identifier (e.g. IP address, MAC address, etc.), transmission protocol (e.g. TCP, UDP, etc.), packet length, a priority level identifier, contents of the payload data, or an application port setting. For example, consider a packet received at instrument port 145. Because the packet is received at instrument port 145 we know that it is received from in-line tool 152. A packet matching process is applied to determine that the packet is associated with a specified flow. Here, based on that process, it is determined that the packet is associated with flow A. Based on the packet dispatch scheme for instrument port 145, the received packet is forwarded via a switching fabric (e.g. of in-line traffic broker module 126) to instrument port 143, which as shown in FIGS. 2A-2D is communicatively coupled to in-line tool 154. This conforms with the specified sequence for traffic belong to flow A, namely in-line tool 150→in-line tool 152→in-line tool 154.

In some embodiments a packet is identified at an instrument port based on an identification tag added to the packet upon receipt at the ingress network port of the network switch appliance 120. In such an embodiment, a packet matching process is applied at the ingress network port upon receipt of the packet form a source node to determine that the packet is associated with a specified flow. In response to determining that the packet is associated with the specified flow a tag is added to the packet that is indicative of the specified flow. This identifying tag stays with the packet as it is routed through the sequence of in-line tools until it transmitted to the destination node. For example, consider a packet with a tag indicative of flow B arriving at instrument port 144 in FIG. 3. Based on the presence of the tag, the packet is known to be associated with flow B. According to the packet dispatch scheme for instrument port 144, packets associated with flow B are forwarded via a switching fabric (e.g. of in-line traffic broker module 126) to network port 132. Because network port 132 is communicatively coupled to network 110, the tag is removed from the packet at or before network port 132 and the packet is transmitted to its destination node via network 110*b*.

FIG. 4 shows example network traffic routes through in-line tools 150, 152, and 154 and through an embedded in-line tool 156 according to an example flow F. As shown in FIG. 3, in this example, traffic associated with flow F is routed through the following sequence of in-line tools: tool 150→tool 152→tool 154→embedded tool 156. The system illustrated in FIG. 3 is similar to the system illustrated in FIGS. 2A-2D except that one of the in-line tools is embedded within the network switch appliance. In some embodiments, the embedded in-line tool 156 is a separate physical component installed within the network switch appliance 120. In other embodiments, the embedded tool 156 is a virtualized tool that may be instantiated in a processing unit (e.g. in-line traffic broker 126) within the network switch appliance 120. Also network switch appliance 120 as shown in FIG. 4 may include, instrument ports 147 and 148 that are communicatively coupled to embedded in-line tool 156. Ports 147 and 148 may be physical or virtual ports depending on the configuration.

In any case, the same principles apply as previously described with reference to FIGS. 2A-2D and FIG. 3. For example, consider a packet determined to be associated with flow F arriving at step 402 at instrument port 146. Based on the packet dispatch scheme for that ingress port, the packet is forwarded at step 404 via a switching fabric (e.g. via in-line traffic broker module 126) to instrument port 147. Instrument port 147 may be considered the "egress port" in this context even though it is not communicatively coupled to a node or component outside of network switch appliance 120. As stated, in use, instrument port 147 is communicatively coupled to embedded in-line tool 156. Therefore the packet is then transmitted at step 406 to embedded in-line tool 156 where it is processed according to the configuration of that tool. After processing, the packet is received at step 408 at instrument port 148. Instrument port 148 may be considered the "ingress port" in this context even though it is not communicatively coupled to a node or component outside of network switch appliance 120. Based on the packet dispatch scheme for instrument port 148, the packet is forwarded at step 410 via a switching fabric (e.g. via in-line traffic broker module 126) to network port 132 where it is then transmitted via network 110*b* to its destination node. Note that in this example, the packet arrived from in-line tool 154 and was forwarded to embedded in-line tool 156 before continuing on to the destination node. This conforms with the specified sequence for flow F of Tool 150→Tool 152→Tool 154→Tool 156.

Translating Flow-to-Tool Sequences into Packet Dispatch Schemes

Figure 5B:
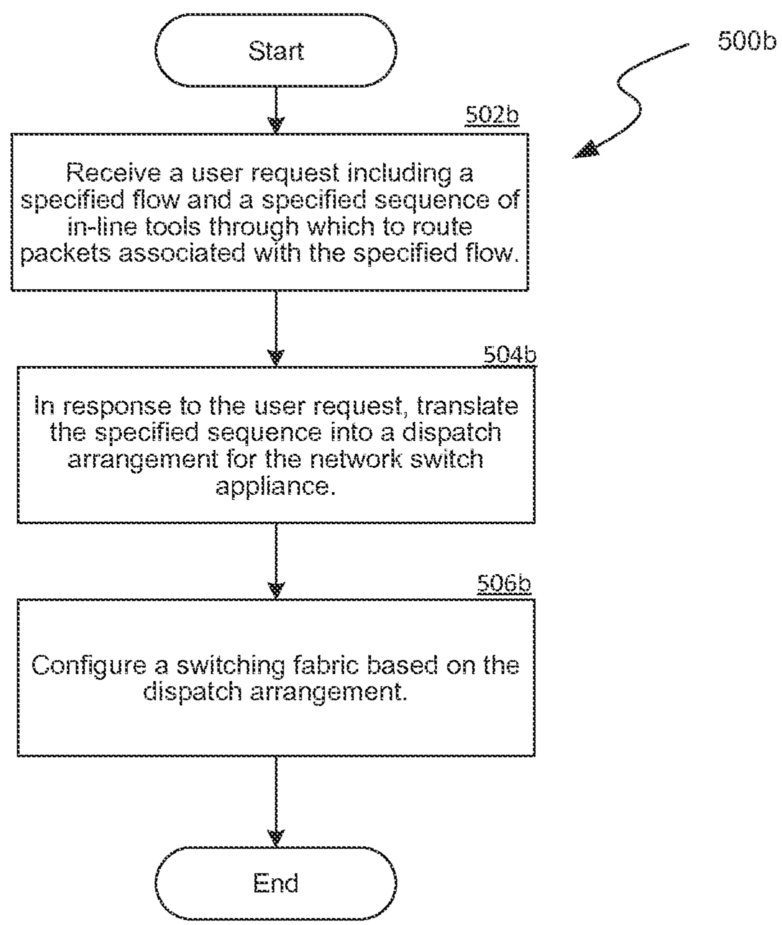
FIG. 5B shows a flow diagram of an example process for translating a flow-to-tool sequence request into a packet dispatch arrangement.

FIG. 5B is a flow diagram 500*b* of an example process for translating flow-to-tool sequence requests into packet dispatch scheme. As discussed above, packet dispatch scheme associated with the ports (instrument and network) of network switch appliance 120 govern the routing of packet traffic and are based on specified sequences of in-line tools through which to route traffic associated with specified flows. Accordingly, in some embodiments a processing unit (e.g. in-line tool broker module 126) is configured to, at step 502*b*, receive user specified flows that define the packet criteria associated with the flows and user specified sequences of in-line tools through which to route packets associated with the flows (i.e. that match the packet criteria). At step 504*b*, In response to receiving a user request with the specified flow and specified sequence, a processing component (e.g. in-line traffic broker module 126) translates the specified sequence into a packet dispatch scheme for the network switch appliance 120 (i.e. for the ports associated with the network switch appliance 120). The procedure for translating the sequence into packet dispatch scheme is described in more detail below. At step 506*b*, a processing component (e.g. in-line traffic broker module 126) configures a switching fabric of the network switch appliance based on the packet dispatch scheme. In some embodiments, a new packet dispatch scheme is created each time a user specifies additional flows and/or adds additional tools or ports to the system. Further, each time a new packet dispatch scheme is translated, the switch fabric is reconfigured to follow the packet dispatch scheme. For example, a switch fabric may currently be configured to handle four flows A, B, C, and D and three in-line tools 150, 152, and 154 as shown in FIGS. 2A-2D. A new embedded in-line tool 156 is added to the system as shown in FIG. 4. The user request is received that adds a specified flow F and specified sequence for flow F as shown in FIG. 4. The specified sequences for flows A-D and F are then translated into packet dispatch scheme based on the port and tool arrangements shown in FIG. 4. The switching fabric is then reconfigured based on the new packet dispatch scheme that takes into consideration the five flows A-D and F and the associated in-line tool sequences.

The following describes an example procedure for translating user requests into packet dispatch scheme. In this example procedure we adopt the following notation:

IN(1), IN(2), . . . , IN(k) are pairs of network ports to which end nodes are attached. In this example, the pair IN(1) consists of ports IN(1)-a and IN(1)-b, the pair IN(2) consists of ports IN(2)-a and IN(2)-b, etc.

IT(1), IT(2), . . . , IT(m) are pairs of instrument ports to which inline tools are attached; the pair IT(1) consists of ports IT(1)-a and IT(1)-b, the pair IT2 consists of ports IT(2)-a and IT(2)-b, etc.

F(1), F(2), . . . , F(n) are traffic flows corresponding to a specific packet matching criteria.

The flow-to-tool-sequence requests can be expressed as associations between inline network ports and sequences of in-line tools:

Request(1): flow(1), inetPort(1), itool(1,1), itool(1,2), itool (1,K1)

Request(2): flow(2), inetPort(2), itool(2,1), itool(2,2), itool (2,K2) . . .

Request(M): flow(M), inetPort(M), itool(M,1), itool(M,2), itool(M,K1)

In the above request definitions:

Flow(I) is one of {F(1), F(2), . . . , F(n)} inetPort(I) is one of {IN(1)-a, IN(1)-b, IN(2)-a, IN(2)-b, . . . , IN(k)-a, IN(k)-b} itool(I,J) is one of {IT(1), IT(2), . . . , IT(m)}

The packet dispatch scheme for the instrument ports then take the form of:

IT(1)-a: <itpFlowA(1,1), dstPortA(1,1)>, <itpFlowA(1,2), dstPortA(1,2)>, . . . , <itpFlowA(1,P1), dstPortA(1,P1)>

IT(1)-b: <itpFlowB(1,1), dstPortB(1,1)>, <itpFlowB(1,2), dstPortB(1,2)>, . . . , <itpFlowB(1,P1), dstPortB(1,P1)>

IT(2)-a: <itpFlowA(2,1), dstPortA(2,1)>, <itpFlowA(2,2), dstPortA(2,2)>, . . . , <itpFlowA(2,P2), dstPortA(2,P2)>

IT(2)-b: <itpFlowB(2,1), dstPortB(2,1)>, <itpFlowB(2,2), dstPortB(1,2)>, . . . , <itpFlowB(2,P2), dstPortB(2, P2)> . . .

IT(m)-a: <itpFlowA(m,1), dstPortA(m,1)>, <itpFlowA(m, 2), dstPortA(m,2)>, . . . , <itpFlowA(m,Pm), dstPortA(m, Pm)>

IT(m)-b: <itpFlowB(m,1), dstPortB(m,1)>, <itpFlowB(m, 2), dstPortB(m,2)>, . . . , <itpFlowB(m,Pm), dstPortB(m, Pm)>

With the above notation a procedure translating the requests into packet dispatch scheme can be described as follows. For the port IT(i)-a, traverse the list of requests Request(1), Request(2), . . . , Request(M) featuring inetPort (r) that are of IN(t)-b type and check if IT(i) is on the list of in-line tools defining the tool sequence for this request. If itool(r,$) equals IT(i) then add the arrangement <flow(r), itookr,s+1)-a> to the list of arrangements for IT(i)-b unless s+1 is greater than Kr in which case add the arrangement <flow(r), inetPort> where inetPort is IN(t)-a when inetPor(r) is equal IN(t)-b. For the port IT(i)-b, traverse the list of requests Request(1), Request(2), Request(M) featuring inetPort(r) that are of IN(t)-a type and check if IT(i) is on the list of in-line tools defining the tool sequence for this request. If itool(r,$) equals IT(i) then add the arrangement <flow(r), itool(r,s+1)-b> to the list of arrangements for IT(i)-b unless s+1 is greater than Kr in which case add the arrangement <flow(r), inetPort> where inetPort is IN(t)-b when inetPor(r) is equal IN(t)-a.

Example Deployment in a Network Environment

Figure 6:
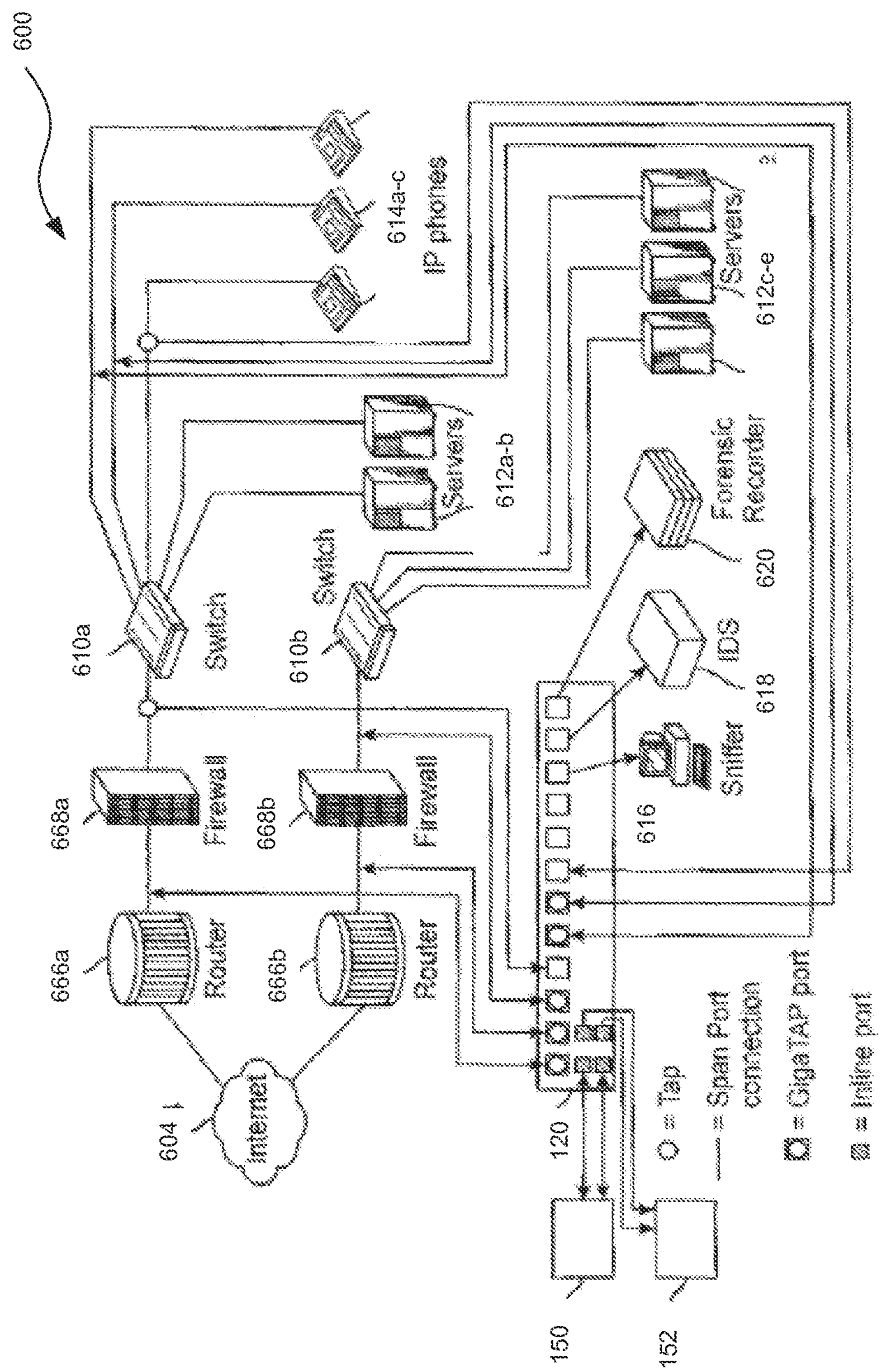
FIG. 6 shows an example deployment of a network switch appliance in a network environment.

FIG. 6 shows the deployment of the network switch appliance 120 in a network environment 600 in accordance with some embodiments. The Internet 604 is coupled via routers 666*a-b* and firewalls 668*a-b* to two switches 610*a* and 610*b*. Switch 610*a* is coupled to servers 612*a-b* and IP phones 614*a-c*. Switch 610*b* is coupled to servers 612*c-e*. A sniffer 616, an IDS 618 and a forensic recorder 620 (collectively, "non-pass through instruments") are coupled to the network switch appliance 120. As illustrated in FIG. 6, there is a reduction on the number of non-pass through instruments in this deployment as compared to a conventional configuration (in which there may be one or more non-pass through instruments between router 666*a* and firewall 668*a*, one or more non-pass through instruments between firewall 668*a* and switch 610*a*, one or more non-pass through instruments between router 666*b* and firewall 668*b*, and firewall 668*b* and switch 610*b*) because the same non-pass through instruments can now access information anywhere in the network environment 600 through the appliance 120. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 614*a-c* can be easily configured to be sent to an IDS 618. It is also possible that traffic inside a particular IP phone 614*a-c* connection can be sent to a sniffer 616, and Intrusion Detection System 618 and a forensic recorder 620 simultaneously via the one-to-many function.

In some embodiments, when using the appliance 120, one or more non-pass through instruments (such as IDS, sniffer, forensic recorder, etc.) may be connected to instrument port(s), and one or more pass through instruments 150, 152 (e.g., IPS) may be connected to other instrument port(s) (e.g., in-line port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the appliance 120, the appliance 120 can compare whether the IDS or the IPS sees more threats, and/or can have a redundant protection such that if the IPS misses any threat, the IDS may pick it up.

Example Computer System Architecture

Figure 7:
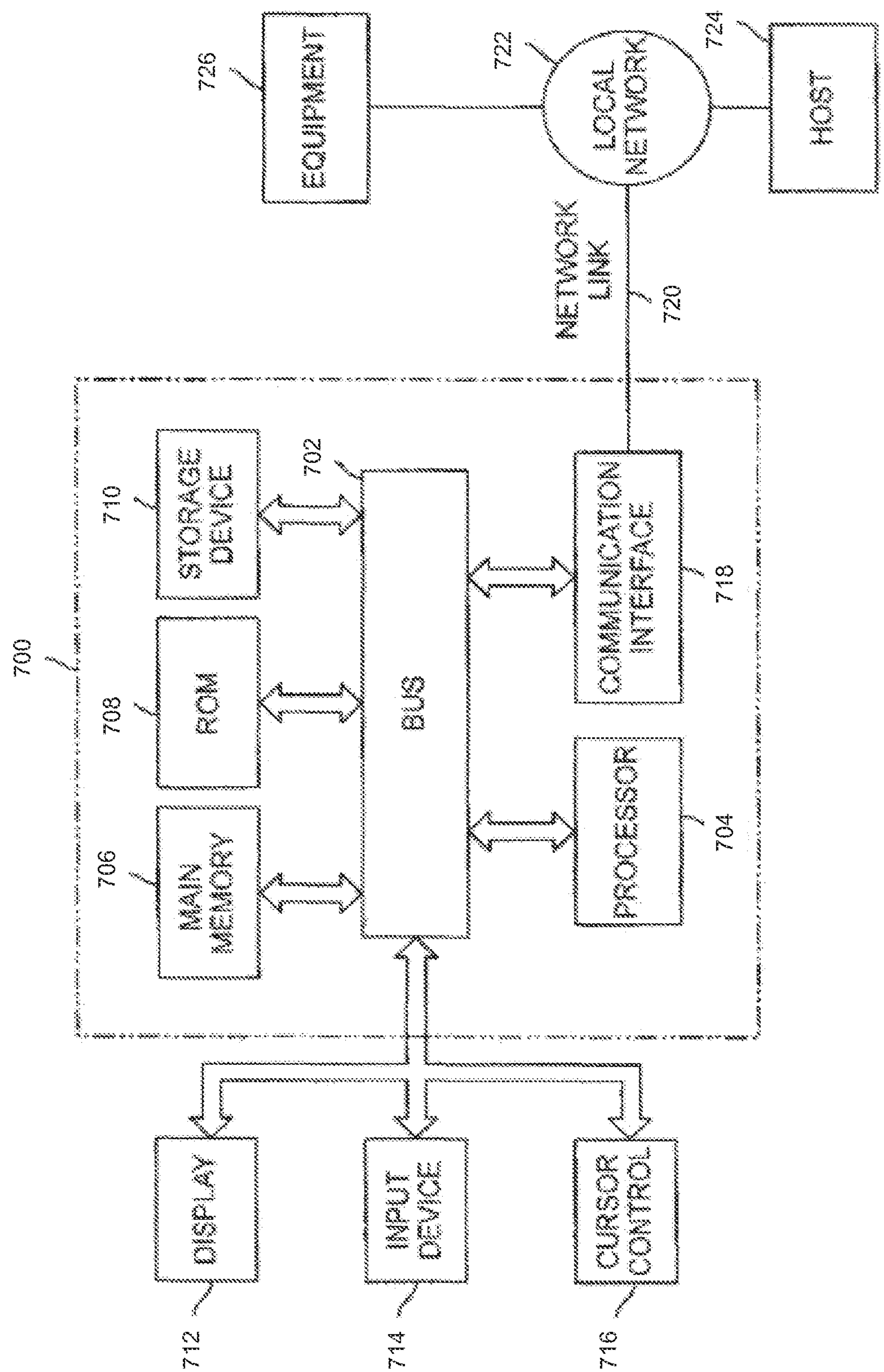
FIG. 7 shows a block diagram of an example computer system 700 in which embodiments described herein may be implemented.

FIG. 7 is a block diagram that illustrates an embodiment of a computer system 700 upon which embodiments described herein may be implemented. Computer system 700 includes a bus 702 or other communication mechanism for communicating information, and a processor 704 coupled with the bus 1202 for processing information. The processor 704 may be used to perform various functions described herein. For example, in some embodiments, the processor 704 may receive input from a user for configuring a network component (e.g., the network switch appliance 120).

The computer system 700 also includes a main memory 706, such as a random access memory (RAM) or other dynamic storage device, coupled to the bus 702 for storing information and instructions to be executed by the processor 704. The main memory 706 also may be used for storing temporary variables or other intermediate information during execution of instructions to be executed by the processor 704. The computer system 700 further includes a read only memory (ROM) 708 or other static storage device coupled to the bus 702 for storing static information and instructions for the processor 704. A data storage device 710, such as a magnetic disk or optical disk, is provided and coupled to the bus 702 for storing information and instructions.

The computer system 700 may be coupled via the bus 702 to a display 712, such as a liquid crystal display (LCD) or light emitting diode (LED) display, for displaying information to a user. An input device 714, including alphanumeric and other keys, is coupled to the bus 702 for communicating information and command selections to processor 704. Another type of user input device is cursor control 716, such as a mouse, a trackball, touch screen display, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The computer system 700 may be used for performing various functions in accordance with the embodiments described herein. According to one embodiment, such use is provided by computer system 700 in response to processor 704 executing one or more sequences of one or more instructions contained in the main memory 706. Such instructions may be read into the main memory 706 from another computer-readable medium, such as storage device 710. Execution of the sequences of instructions contained in the main memory 706 causes the processor 704 to perform the process steps described herein. One or more processors in a multi-processing arrangement may also be employed to execute the sequences of instructions contained in the main memory 706. In alternative embodiments, hard-wired circuitry may be used in place of or in combination with software instructions to implement features of the embodiments described herein. Thus, embodiments described herein are not limited to any specific combination of hardware circuitry and software.

The term "computer-readable medium" as used herein refers to any medium that participates in providing instructions to the processor 704 for execution. Such a medium may take many forms, including but not limited to, non-volatile media, volatile media, and transmission media. Non-volatile media includes, for example, optical or magnetic disks, such as the storage device 710. A non-volatile medium may be considered to be an example of a non-transitory medium. Volatile media includes dynamic memory, such as the main memory 706. A volatile medium may be considered to be another example of a non-transitory medium. Transmission media includes coaxial cables, copper wire and fiber optics, including the wires that comprise the bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 704 for execution. For example, the instructions may initially be carried on a magnetic disk of a remote computer. The remote computer can load the instructions into its dynamic memory and send the instructions over a telephone line using a modem. A modem local to the computer system 700 can receive the data on the telephone line and use an infrared transmitter to convert the data to an infrared signal. An infrared detector coupled to the bus 702 can receive the data carried in the infrared signal and place the data on the bus 702. The bus 702 carries the data to the main memory 706, from which the processor 704 retrieves and executes the instructions. The instructions received by the main memory 706 may optionally be stored on the storage device 710 either before or after execution by the processor 1204.

The computer system 700 also includes a communication interface 718 coupled to the bus 702. The communication interface 718 can include one or more ports to couple computer system 700 with one or more other devices over one or more point-to-point links, local area networks (LANs), wide area networks (WANs), the global Internet, virtual private networks (VPNs) implemented over a public network, or the like. For example, as shown in FIG. 7, communication interface 718 provides a two-way data communication coupling to a network link 720 that is connected to a local network 722. For example, the communication interface 718 may be an integrated services digital network (ISDN) card or a modem to provide a data communication connection to a corresponding type of telephone line. As another example, the communication interface 718 may be a local area network (LAN) card to provide a data communication connection to a compatible LAN. Wireless links may also be implemented. In any such implementation, the communication interface 718 sends and receives electrical, electromagnetic or optical signals that carry data streams representing various types of information.

The network link 720 typically provides data communication through one or more networks to other devices. For example, the network link 720 may provide a connection through local network 722 to a host computer 724 or to equipment 726 such as a radiation beam source or a switch operatively coupled to a radiation beam source. The data streams transported over the network link 720 can comprise electrical, electromagnetic or optical signals. The signals through the various networks and the signals on the network link 720 and through the communication interface 718, which carry data to and from the computer system 700, are exemplary forms of carrier waves transporting the information. The computer system 700 can send messages and receive data, including program code, through the network(s), the network link 720, and the communication interface 718.

It should be noted that when a "packet" is described in this application, the term may refer to the original packet that is transmitted from a node, or a copy of it.

Although particular embodiments have been shown and described, they are not intended to limit the invention except as recited in the appended claims. Changes and modifications may be made without departing from the spirit and scope of the claimed invention. The specification and drawings are, accordingly, to be regarded in an illustrative rather than restrictive sense. The claimed invention covers alternatives, modifications, and equivalents, as defined by the claims.

What is claimed is:

1. A method comprising:

receiving, at a network switch appliance, first user input that specifies:

a first traffic flow; and a first sequential order of in-line tools through which to route packets associated with the first traffic flow;

receiving, at the network switch appliance, second user input that specifies:

a second traffic flow; and a second sequential order of in-line tools through which to route packets associated with the second traffic flow;

wherein the second sequential order is different from the first sequential order;

in response to at least one of the first user input that specifies the first traffic flow and the first sequential order of in-line tools or the second user input that specifies the second traffic flow and the second sequential order of in-line tools, generating, by the network switch appliance, a separate packet dispatch scheme for each of a plurality of ports of the network switch appliance based on the first user input and the second user input, to produce a plurality of packet dispatch schemes, wherein the packet dispatch scheme for at least one port of the plurality of ports includes separate packet forwarding information for each of a plurality of different packet flows;

receiving, at the network switch appliance, a packet at a first port of a plurality of ports of a network switch appliance;

wherein the packet originated at a source node on a computer network and is destined for a destination node on the computer network; and forwarding, by the network switch appliance, the packet to a second port of the plurality of ports of the network switch appliance according to a packet dispatch scheme, of the plurality of packet dispatch schemes, that is specific to the first port.

2. The method of claim 1, further comprising:

transmitting the packet, via the second port, to the destination node in response to determining that, according to the packet dispatch scheme, the second port is a network port of the network switch appliance, the network port communicatively coupled to the destination node.

3. The method of claim 1, further comprising:

transmitting the packet, via the second port, to an in-line tool in response to determining that, according to the packet dispatch scheme specific to the first port, the second port is an instrument port of the network switch appliance, the instrument port communicatively coupled to the in-line tool, the in-line tool associated with one of the plurality of specified sequences of in-line tools.

4. The method of claim 1, wherein the plurality of ports of the network switch appliance include a plurality of instrument ports, each of the plurality of instrument ports communicatively coupled with one of a plurality of in-line tools.

5. The method of claim 1, wherein the first traffic flow is a first segment of network traffic comprising packets that satisfy a specified first criterion and wherein the second traffic flow is a second segment of network traffic comprising packets that satisfy a specified second criterion, and wherein the specified first criterion is different from the specified second criterion.

6. The method of claim 5, wherein the specified first criterion and specified second criterion are based on one or more of: a source node identifier, a destination node identifier, a unique packet identifier, a packet length, a transmission protocol, a priority level identifier, payload data, or an application port setting.

7. The method of claim 1, wherein each of a plurality of in-line tools is included no more than one time in each of the first sequential order of in-line tools and the second sequential order of in-line tools.

8. The method of claim 1, wherein each of a plurality of in-line tools is communicatively coupled with two of a plurality of instrument ports of the network switch appliance.

9. The method of claim 1, wherein the forwarding is performed via a programmable switching fabric associated with the network switch appliance.

10. The method of claim 1, further comprising:

determining that the packet is associated with the first traffic flow by determining that the packet includes a tag indicative of the first traffic flow.

11. The method of claim 10, further comprising:

after forwarding the packet to the second port, removing the tag from the packet in response to determining that, according to the packet dispatch scheme, the second port is a network port of the network switch appliance, the network port communicatively coupled to the destination node; and transmitting the packet without the tag, via the second port, to the destination node.

12. The method of claim 1, further comprising:

receiving third user input specifying:

a third traffic flow; and a third sequential order of in-line tools through which to route packets associated with the third flow; and in response to receiving the third user input, generating a new packet dispatch scheme for each of the plurality of ports of the network switch appliance based on the first user input, the second user input, and third user input.

13. The method of claim 12, further comprising:

configuring a switching fabric of the network switch appliance based on the new packet dispatch scheme for each of the plurality of ports.

14. The method of claim 1, wherein at least one of the in-line tools is a virtual tool.

15. The method of claim 1, wherein at least one of the in-line tools is embedded in the network switch appliance.

16. A system comprising:

a processor, and memory accessible to the processor and having instructions stored therein, execution of which by the processor causes the system to:

receive, at a network switch appliance, first user input specifying:

a first traffic flow; and a first sequential order of in-line tools through which to route packets associated with the first traffic flow;

receive, at the network switch appliance, second user input specifying:

a second traffic flow; and a second sequential order of in-line tools through which to route packets associated with the second traffic flow;

wherein the second sequential order is different from the first sequential order;

in response to at least one of the first user input that specifies the first traffic flow and the first sequential order of in-line tools or the second user input that specifies the second traffic flow and the second sequential order of in-line tools, generate, by the network switch appliance, a separate packet dispatch scheme for each of a plurality of ports of the network switch appliance based on the first user input and the second user input, to produce a plurality of packet dispatch schemes, wherein the packet dispatch scheme for at least one port of the plurality of ports includes separate packet forwarding information for each of a plurality of different packet flows;

receive, at the network switch appliance, a packet at a first port of a plurality of ports of a network switch appliance, wherein the packet originated at a source node on a computer network and is destined for a destination node on the computer network; and forward, by the network switch appliance, the packet to a second port of the plurality of ports of the network switch appliance according to a packet dispatch scheme, of the plurality of packet dispatch schemes, that is specific to the first port.

17. A network switch appliance comprising:

a plurality of network ports for communication with a plurality of nodes on a computer network;

a plurality of instrument ports for communication with a plurality of in-line tools;

a switching fabric;

a processor, and memory having instructions stored thereon which when executed by the processor, cause the network switch appliance to:

receive first user input that specifies:

a first traffic flow; and a first sequential order of in-line tools through which to route packets associated with the first traffic flow;

receive second user input that specifies:

a second traffic flow; and a second sequential order of in-line tools through which to route packets associated with the second traffic flow;

wherein the second sequential order is different from the first sequential order;

in response to at least one of the first user input that specifies the first traffic flow and the first sequential order of in-line tools or the second user input that specifies the second traffic flow and the second sequential order of in-line tools, generate a separate packet dispatch scheme for each of the plurality of network ports and instrument ports of the network switch appliance based on the first user input and the second user input, to produce a plurality of packet dispatch schemes, wherein the packet dispatch scheme for at least one port of the plurality of ports includes separate packet forwarding information for each of a plurality of different packet flows;

receive a packet at a first port of the network switch appliance, the first port being one of the plurality of network ports or instrument ports of the network switch appliance;

wherein the packet originated at a source node on the computer network and is destined for a destination node on the computer network; and forward the packet, via the switching fabric, to a second port of the network switch appliance according to a packet dispatch scheme, of the plurality of packet dispatch schemes, that is specific to the first port, wherein the second port is one of the plurality of network ports or instrument ports of the network switch appliance.

18. The network switch appliance of claim 17, wherein the memory has further instructions stored thereon, which when executed by the processor, cause the system to further:

transmit the packet, via the second port, to the destination node, in response to determining that, according to the packet dispatch scheme, the second port is a particular network port of the plurality of network ports, the particular network port communicatively coupled to the destination node.

19. The network switch appliance of claim 17, wherein the memory has further instructions stored thereon, which when executed by the processor, cause the system to further:

transmit the packet, via the second port, to a particular in-line tool of a plurality of in-line tools, in response to determining that, according to the packet dispatch scheme, the second port is a particular instrument port of the plurality of instrument ports, the particular instrument port communicatively coupled to the particular in-line tool.

20. The network switch appliance of claim 17, wherein the memory has further instructions stored thereon, which when executed by the processor, cause the system to further:

receive third user input specifying:

a third traffic flow; and a third sequential order of in-line tools through which to route packets associated with the third traffic flow;

in response to receiving the third user input, generate a new packet dispatch scheme for each of the plurality of ports of the network switch appliance based on the first user input, the second user input, and third user input; and configure the switching fabric based on the new packet dispatch schemes.

* * * * *